United States Patent [19]

Ishii

[11] Patent Number: 5,619,414
[45] Date of Patent: Apr. 8, 1997

[54] THERMAL DISPLACEMENT CORRECTING METHOD OF MACHINE TOOL

[75] Inventor: Hisao Ishii, Tokyo, Japan

[73] Assignee: Fanuc, Ltd., Yamanashi, Japan

[21] Appl. No.: 425,746

[22] Filed: Apr. 20, 1995

[30] Foreign Application Priority Data

Apr. 27, 1994 [JP] Japan ................................ 6-110215

[51] Int. Cl.[6] ................... G05B 19/048; G05B 19/404
[52] U.S. Cl. ................ 364/474.17; 364/474.19; 364/474.35; 318/565; 318/634
[58] Field of Search ................... 364/474.15, 474.16, 364/474.17, 474.19, 474.35; 318/634, 561, 563, 565

[56] References Cited

U.S. PATENT DOCUMENTS 3,873,816  3/1975  Takeyama et al. ............ 364/474.17 X
4,550,277  10/1985  Carney ............................ 364/474.12 X
5,444,640  8/1995  Hirai .................................. 364/474.35

*Primary Examiner*—Joseph Ruggiero
*Attorney, Agent, or Firm*—Staas & Halsey

[57] ABSTRACT

A method of correcting thermal displacement error in a driving system of a machine tool comprises forming a heat distribution model including the driving system, and finding an amount of drive in the driving system in the heat distribution model, estimating a heating value supplied to the heat distribution model depending upon the amount of drive, estimating a temperature distribution state in the distribution model by finding a time variation of heating value in the heat distribution model receiving supply of the estimated heating value, finding an amount of heat displacement in the driving system depending upon the temperature distribution state and finding a correction value for thermal displacement correction depending upon the amount of thermal displacement. It is thereby possible to correct the thermal displacement error in the driving system of the machine tool without a detector.

5 Claims, 11 Drawing Sheets

FIG. 15

| | INITIAL TEMPER- ATURE $T_0$ | CURRENT TEMPER- ATURE T | INITIAL POSI- TION $x_0$ | CURRENT POSI- TION x | AMOUNT OF DISPLACE- MENT $\Delta x_i$ | AMOUNT OF DISPLACE- MENT ERROR d | LENGTH $L_i$ | COEFFICIENT OF LINEAR EXPANSION $\alpha$ | HEAT CAPACITY q | COEFFICIENT OF HEAT TRANSFER k | HEATING VALUE Q | HEATING INTERVAL |
|---|---|---|---|---|---|---|---|---|---|---|---|---|
| INTERVAL 1 | $T_{10}$ | $T_1$ | $x_{10}$ | $x_1$ | $\Delta x_1$ | $d_1$ | $L_1$ | $\alpha_1$ | $q_1$ | $k_1$ | | |
| INTERVAL 2 | $T_{20}$ | $T_2$ | $x_{20}$ | $x_2$ | $\Delta x_2$ | $d_2$ | $L_2$ | $\alpha_2$ | $q_2$ | $k_2$ | | |
| INTERVAL 3 | $T_{30}$ | $T_3$ | $x_{30}$ | $x_3$ | $\Delta x_3$ | $d_3$ | $L_3$ | $\alpha_3$ | $q_3$ | $k_3$ | | |
| ... | ... | ... | ... | ... | ... | ... | ... | ... | ... | ... | | |
| INTERVAL i | $T_{i0}$ | $T_i$ | $x_{i0}$ | $x_i$ | $\Delta x_i$ | $d_i$ | $L_i$ | $\alpha_i$ | $q_i$ | $k_i$ | | |
| ... | ... | ... | ... | ... | ... | ... | ... | ... | ... | ... | | |
| INTERVAL n | $T_{n0}$ | $T_n$ | $x_{n0}$ | $x_n$ | $\Delta x_n$ | $d_n$ | $L_n$ | $\alpha_n$ | $q_n$ | $k_n$ | | |
| HEATING SOURCE 1 | | | $x_{10H}$ | $x_{1H}$ | | | | | | | $Q_1$ | k |
| HEATING SOURCE 2 | | | $x_{20H}$ | $x_{2H}$ | | | | | | | $Q_2$ | l |
| ... | | | ... | ... | | | | | | | ... | ... |
| HEATING SOURCE j | | | $x_{j0H}$ | $x_{jH}$ | | | | | | | $Q_j$ | m |
| ... | | | ... | ... | | | | | | | ... | ... |

THERMAL DISPLACEMENT CORRECTING METHOD OF MACHINE TOOL

BACKGROUND OF THE INVENTION

1. Field of the Invention

This invention relates to a thermal displacement correcting method of correcting displacement, caused by heat, in a drive system of a tool machine.

2. Description of the Related Art

A driving system of a tool machine includes, for example, a motor serving as a driving source, and a driving shaft actuated by a driving force from the driving source, a table moved by the driving shaft. A workpiece is disposed on the table actuated by the driving system to be moved or positioned by driving the driving system.

In the driving system of the machine tool, heat may be generated from the driving source such as a motor, or heat may be generated due to friction or the like from a driving mechanism in a mechanical system such as ball screw interposed between the driving shaft and the table. The heat generation causes a variation in temperature in the driving system such as a driving shaft, and the variation in temperature results in thermal displacement in the driving system due to thermal expansion. The thermal displacement in the driving system generates deviation from a correct position when the table is positioned. Positioning error of the table affects a work positioning accuracy, and causes reduction of a work machining accuracy.

In the prior art, there are known methods of correcting the positioning error due to the thermal displacement, including, for example, the following methods:

1) A method having the steps of mounting a temperature sensor at each position of a mechanism portion in the driving system, calculating an amount of thermal displacement depending upon a temperature obtained from the temperature sensor, and correcting thermal displacement error in the driving system of the tool machine by using the amount of thermal displacement;

2) A method having the steps of measuring a size of a finished work after machining by using a length measuring machine, indirectly finding an amount of thermal displacement of a machine tool depending upon the measured value, and correcting thermal displacement error in a driving system of the machine tool by using the amount of thermal displacement; and 3) A method having the steps of measuring shaft positions of a machine tool before and after machining by using a position sensor or a length measuring machine, finding an amount of thermal displacement of the machine tool depending upon the measured values, and correcting thermal displacement error in a driving system of the machine tool by using the amount of thermal displacement.

FIG. 16 is an explanatory view of a method of correcting thermal displacement error in a driving system of a conventional machine tool, generally showing one embodiment of the driving system used for the machine tool. In FIG. 16, the driving system includes a motor 3 serving as the driving source, a driving shaft 1 connected to the motor 3 through a joint 4 and actuated by driving force of the motor 3, a nut 2 moved in conjunction with the driving shaft 1, a table 8 mounted on the nut 2 to support a work 9, and so forth. Further, the driving shaft 1 is mounted on a base 7 through a fixed bearing 5 and a supporting bearing 6.

For example, in the driving system used for the machine tool, temperature sensors 10 and 11 are mounted on the driving shaft 1, or the nut 2, thereby using the temperature sensors as means for finding the amount of thermal displacement. Thus, the thermal displacement error is found depending upon temperature measured by the temperature sensor. Alternatively, a position sensor 12 is mounted separately from the machine tool to find the thermal displacement error of the driving shaft 1 depending upon position data of the position sensor.

In each of the conventional methods of correcting the thermal displacement, there is inevitably generated a problem in that a detector such as temperature sensor or length measuring machine is required.

OBJECTS AND SUMMARY OF THE INVENTION

In order to overcome the conventional problem as described above, it is an object of the present invention to provide a method of correcting thermal displacement error in a driving system of a machine tool without a detector.

The present invention can be summarized in the following description.

A method of the present invention comprises the steps of forming a heat distribution model including a driving system, finding an amount of drive in the driving system in the heat distribution model, estimating a heating value supplied to the heat distribution model depending upon the amount of drive, estimating a temperature distribution state in the distribution model by finding a time variation of heating value in the heat distribution model receiving supply of the estimated heating value, finding an amount of thermal displacement in the driving system depending upon the temperature distribution state, and finding a correction value for thermal displacement correction depending upon the amount of thermal displacement, thereby correcting the thermal displacement error in the driving system of a machine tool.

The heat distribution model according to the present invention is formed by dividing component parts including the driving system of the machine tool into elements including a finite number of intervals. Further, the heat distribution model can be used as a basis to find the temperature distribution state and the amount of thermal displacement.

In the heat distribution model according to the present invention, the time variation of heating value is found depending upon heating value exchange between adjacent areas in the heat distribution model, and is a variation in heating value given by accumulation of heating values obtained by a difference between supply and dissipation of heating value. For example, supply of the heating value includes heat supply from the heating source, and heat transfer from the adjacent areas. On the other hand, the dissipation of heating value includes, for example, heat transfer to the adjacent areas, and heat dissipation to the outside air.

In the heat distribution model according to the present invention, a supply source of the heating value includes, for example, a driving source in the driving system, and a driving mechanism portion in a system of amount of drive. Further, a heating value of the driving source in the driving system can be estimated by using a driving speed and driving torque of the driving source as the amount of drive. A heating value of the driving mechanism portion in the system of amount of drive can be found by estimating a heating value by using a speed related to a relative speed at the portion as the amount of drive. As the speed, for example, a driving speed of the driving source may be used. Then, the estimated heating value is supplied to the heat distribution model.

According to the present invention, a method of correcting thermal displacement error in a driving system of a machine tool may be applied to, for example, various numerical control units.

According to the present invention, there is provided a correcting method of correcting thermal displacement error depending upon an amount of drive, which can be found without an additional detector and so forth in a driving system of a machine tool. In the method, a temperature distribution state and an amount of thermal displacement at portions forming the driving system of the machine tool are estimated depending upon the amount of drive, and the amount of thermal displacement is defined as a correction value for thermal displacement correction. It is thereby possible to correct the thermal displacement error in the driving system of the machine tool without a detector such as temperature sensor or position sensor.

FIG. 1 is a flowchart illustrating a method of correcting thermal displacement error in a machine tool according to the present invention.

The correcting method of the present invention, has the step of estimating a temperature distribution state in a heat distribution model, which causes thermal displacement error so as to find the thermal displacement error in the driving system of the machine tool without a detector. The temperature distribution state is estimated by a time variation of heating value in the heat distribution model. Further, a heating value supplied to the heat distribution model can be found according to estimation depending upon the amount of drive in the driving system. In the estimation of the heating value by using the amount of drive in the driving system, a heating source includes, for example, a driving source in the driving system, and a driving mechanism portion in a system of amount of drive. The amount of drive can be found without an additional detector and so forth in the driving system of the machine tool. For example, a driving speed and driving torque can be used as the amount of drive in the driving source in the driving system, and a heating value from the driving source can be estimated depending upon the amount of drive. Further, in the driving mechanism portion in the system of amount of drive, an amount related to a relative speed at the portion can be used as the amount of drive. For example, the driving speed of the driving source can be employed as the related amount, and a heating value from the driving mechanism can be estimated depending upon the related amount.

Referring to the flowchart of FIG. 1, in the method of correcting the thermal displacement error in a machine tool according to the present invention, a heat distribution model is initially formed on the basis of component parts including a driving system of the machine tool requiring correction of the thermal displacement error (Step S1). In the formation of the heat distribution model, target component parts of the machine tool can be selected, and the heat distribution model can be formed by the selected component parts.

Subsequently, a heating value is estimated depending upon an amount of drive in the driving system, and the estimated heating value is supplied to the heat distribution model (Step S2). For example, a relationship between the amount of drive and the heating value in the driving system can be previously found as a form of a relational expression or a data table, thereby estimating the heating value depending upon the relationship.

Subsequently, a temperature distribution state of the heat distribution model is estimated depending upon a time variation of heating value (Step S3). The time variation of heating value in the heat distribution model can be estimated depending upon heating value exchange between adjacent areas in a finite number of intervals of the heat distribution model. That is, the estimation can be performed by a variation in heating value caused by accumulation of a heating value obtained by difference between supply and dissipation of heating value. The supply of the heating value is carried out by, for example, heat supply from a heating source or heat transfer from the adjacent areas. The dissipation of the heating value is carried out by, for example, heat transfer to the adjacent areas or heat dissipation to the outside air. For example, coefficients of heating value transfer between the adjacent areas are found as a form of the relational expression or the data table, thereby enabling the heating value exchange depending upon the coefficient of transfer.

Further, an amount of thermal displacement in the driving system is estimated depending upon the temperature distribution state in the heat distribution model (Step S4). The amount of thermal displacement can be estimated depending upon a relationship between a variation in temperature at portions forming the driving system and an amount of displacement corresponding to the variation in temperature.

Finally, an amount of correction for the thermal displacement correction is found depending upon the estimated amount of thermal displacement (Step S5). A value of the estimated amount of thermal displacement can be directly used as the correction value.

BRIEF DESCRIPTION OF THE DRAWINGS

The foregoing and other objects and features of the invention will become apparent from the following description of preferred embodiments of the invention with reference to the accompanying drawings, in which:

FIG. 15 is a block diagram to find the amount of displacement error di in each interval i according to the present invention.

DETAILED DESCRIPTION OF THE PREFERRED EMBODIMENTS

Figure 1:
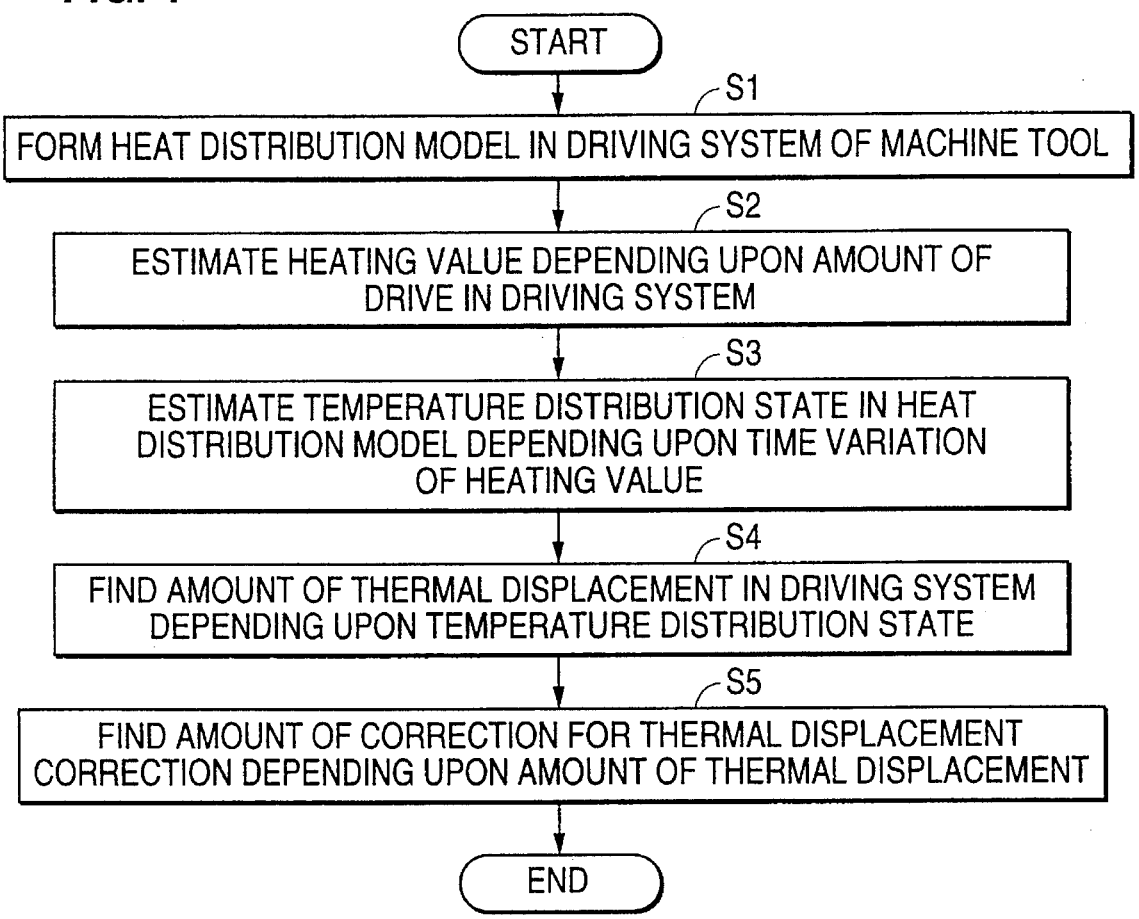
FIG. 1 is a flowchart illustrating a method of correcting thermal displacement error in a machine tool according to the present invention.

According to the present invention, a method of correcting thermal displacement of a machine tool is carried out according to the procedure shown in a flowchart of FIG. 1. A heat distribution model is initially formed on the basis of component parts including a driving system of the machine tool (Step S1). A heating value is estimated depending upon an amount of drive in the driving system (Step S2), and the estimated heating value is supplied to the heat distribution model. Subsequently, in the heat distribution model receiving supply of the heating value, a temperature distribution state is estimated by estimating a time variation of the heating value in response to movement or storage (Step S3). Further, an amount of thermal displacement in the driving system is estimated depending upon the temperature distribution state estimated in the heat distribution model (Step S4). Then, an amount of correction for thermal displacement correction is found depending upon the estimated amount of thermal displacement (Step S5).

A more specific description will now be given of the procedure of the thermal displacement correcting method of the machine tool according to the present invention shown in FIG. 1 with reference to the following embodiment.

Figure 2:
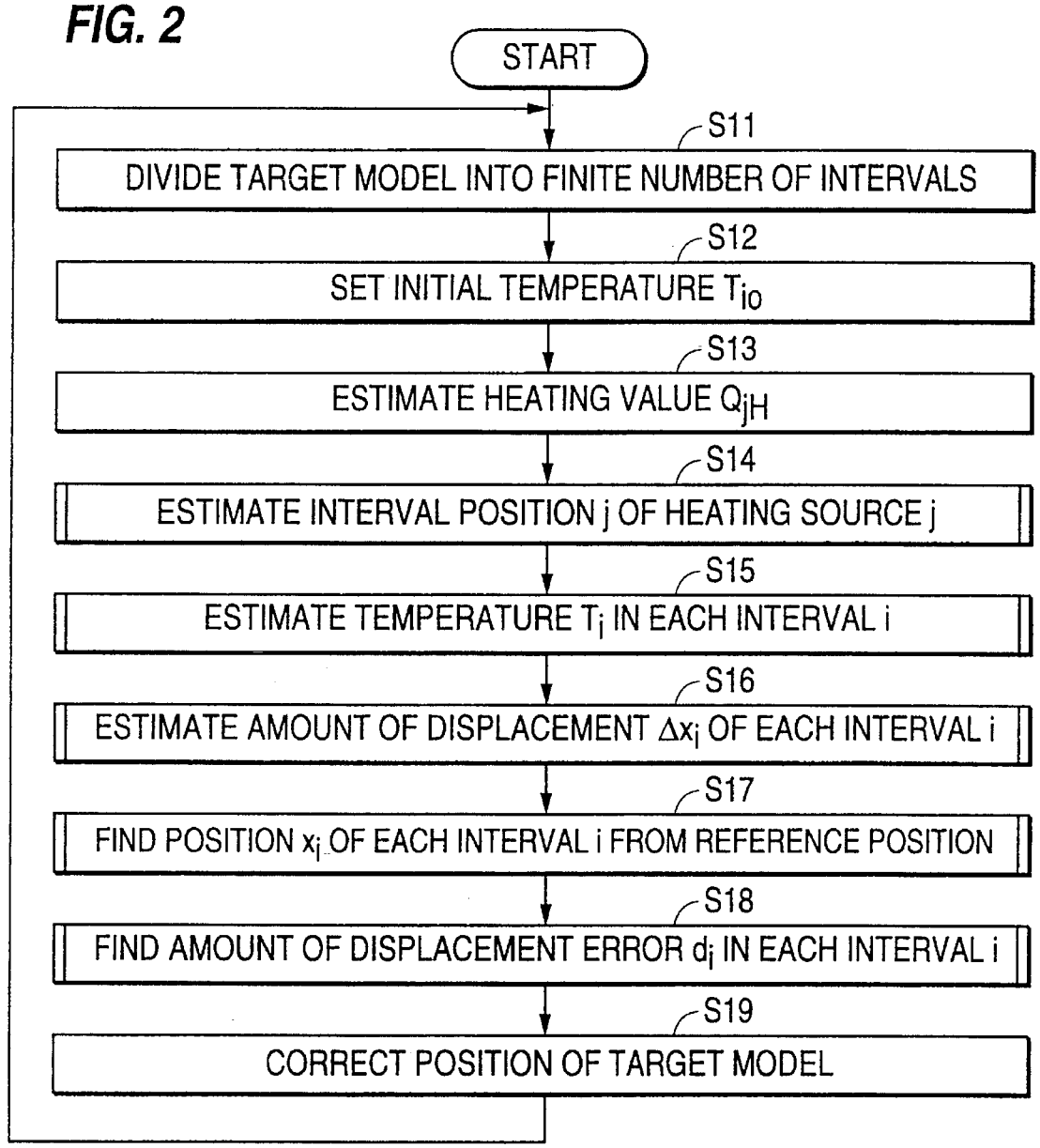
FIG. 2 is a flowchart illustrating one embodiment of the thermal displacement correcting method in the machine tool according to the present invention.

FIG. 2 is a flowchart illustrating one embodiment of the thermal displacement correcting method of the machine tool according to the present invention. Referring to FIG. 2, the following description will be given by using reference numerals from Step S11 to Step S19.

Figure 4A:
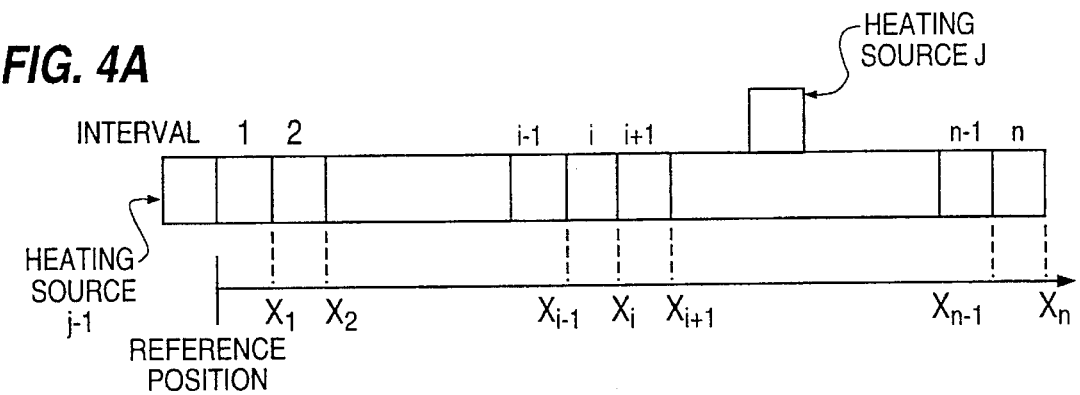
FIGS. 4A, 4B and 4C are explanatory diagrams of a heat distribution model according to the present invention.

Step S11: A target model is initially set for the purpose of the thermal displacement correction of the machine tool, and the target model is divided into a finite number of intervals. The divided intervals form areas of the heat distribution model. For example, when the thermal displacement correcting method of the machine tool according to the present invention is applied to a driving system of a machine tool shown in FIG. 16, a target model as shown in FIG. 4(A) is set. In the heat distribution model using the target model, a driving shaft 1 is divided into n intervals including interval 1 to interval n, that is, the finite number of intervals. Further, a motor 3 serving as a heat generating source is defined as a heating source j-1, and a driving mechanism portion (including the driving shaft 1 and a nut 2) serving as another heat generating source is defined as a heating source j. The driving shaft 1 can be divided into the intervals, for example, in one way in which a size of the interval is determined such that a variation in the heat distribution in the interval becomes smaller to be regarded entirely equally, or in another way in which a divided form for the division is adjusted.

Figure 16:
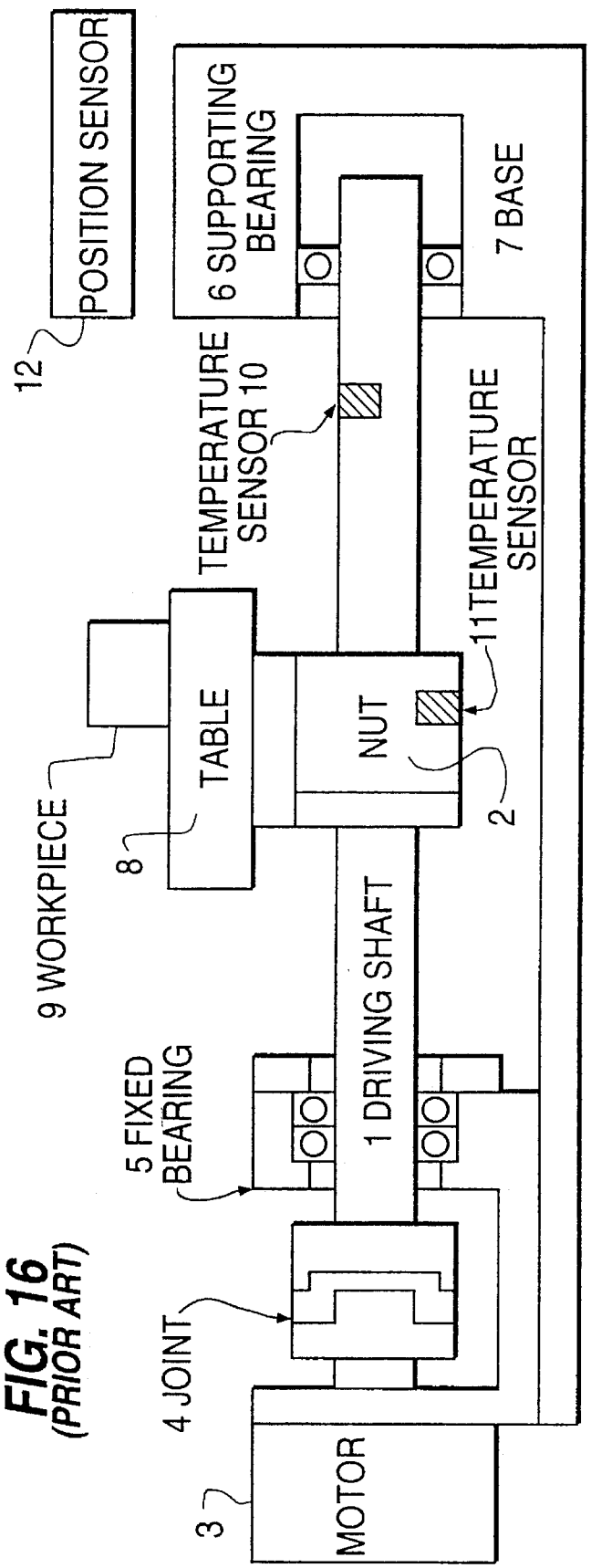
FIG. 16 is a diagram illustrating a method of correcting thermal displacement error in a driving system of a conventional machine tool.

The heat distribution model corresponding to FIG. 16 can be formed as shown in, for example, FIG. 4(A). In FIG. 4(A), a workpiece 9 corresponds to a position of the heating source j, and the motor 3 corresponds to the heating source j-1. It is possible to define, for example, a position of the heating source j-1 as a reference position to determine thermal displacement in the thermal distribution model. Alternatively, the reference position may be optionally set.

When the reference position is set to the position of the heating source j-1 corresponding to the motor 3, positions of the intervals can be set according to the x-coordinate shown by the arrow in FIG. 4(A), and the thermal displacement can be found according to the x-coordinate. The positions of the intervals on the x-coordinate are represented by reference numerals $x_1, x_2, \ldots, x_{i-1}, x_i, x_{i+1}, \ldots, x_{n-1}$, and $x_n$.

The intervals will be described infra by way of the interval i as one embodiment.

Step S12: Subsequently, an initial temperature $T_{i0}$ is set in the intervals i of the heat distribution model set in the process of Step S11. Although the initial temperature $T_{i0}$ may be separately set for each interval, the initial temperature $T_{i0}$ for all the intervals can be set to an outside air temperature $T_{air}$ when it can be considered that a temperature of the machine tool is identical with the outside air temperature $T_{air}$.

Alternatively, when a difference in temperature between the intervals is caused due to heat generated by, for example, driving of the machine tool, the initial temperature may be set for each interval. The initial temperature is stored in a memory. FIG. 15 shows one embodiment of the memory used in the embodiment of the thermal displacement correcting method of the machine tool according to the present invention. In the embodiment, the initial temperature $T_{i0}$ is stored for each interval i.

In a storage area corresponding to each interval i, there are prepared areas to contain, in addition to the initial temperature $T_{i0}$, a current temperature T, an initial position $x_0$, a current position x, an amount of displacement $\Delta x_i$, an amount of displacement error d, a length $L_i$, coefficient of linear expansion $\alpha_i$, heat capacity $q_i$, coefficient of heat transfer $k_i$, and so forth as will be described infra.

In this case, the initial temperature $T_{i0}$ is used to estimate a temperature $T_i$ in each interval i, and calculate an amount of displacement error $d_i$ for each interval i.

Step S13: A heating value $Q_{jH}$ generated from the heating source j is subsequently estimated. When the heating source serves as a driving source such as motor, the heating value $Q_{jH}$ can be expressed as a function of a rotational speed n of the motor and load. The load can be estimated depending upon current I supplied to the motor so that the heating value $Q_{jH}$ can be estimated depending upon the rotational speed n of the motor and the supplied current I. Hence, a relationship between the rotational speed n of the motor and the supplied current I is previously found with respect to the heating value $Q_{jH}$, and the relationship is stored as a relational expression or a table. Depending upon the relational expression or the table, it is possible to estimate the heating value $Q_{jH}$ corresponding to the rotational speed n and the supplied current I which can be known at a time of normal use of the motor.

Alternatively, when, for example, frictional heat at a mechanism portion in the driving system is used as the heating source j, the heating value $Q_{jH}$ can be expressed as a function of a relative speed at the mechanism portion. The relative speed at the mechanism portion can be expressed by using the rotational speed n of the motor as parameter when, for example, the driving system includes a driving shaft using a ball screw. Thus, the heating value $Q_{jH}$ can be estimated depending upon the rotational speed n of the motor. For this purpose, a relationship between the heating value $Q_{jH}$ and the rotational speed n of the motor is previously found, and the relationship is stored as a relational expression or a table. Depending upon the relational expression or the table, it is possible to estimate the heating value $Q_{jH}$ corresponding to the rotational speed n which can be known at the time of normal use of the motor.

FIG. 4(A) shows a case where the heating source j-1 is fixed in the driving system, and the heating source j is movable in the driving system.

Step S14: In general, the temperature distribution in the heat distribution model is varied according to the position of the heating source. Since the heating source j in FIG. 4(A) serves as a movable heating source, it is necessary to find an interval position j of the movable heating source j in the heat distribution model. Hence, the interval position j of the movable heating source j in the heat distribution model is subsequently found.

Figure 5:
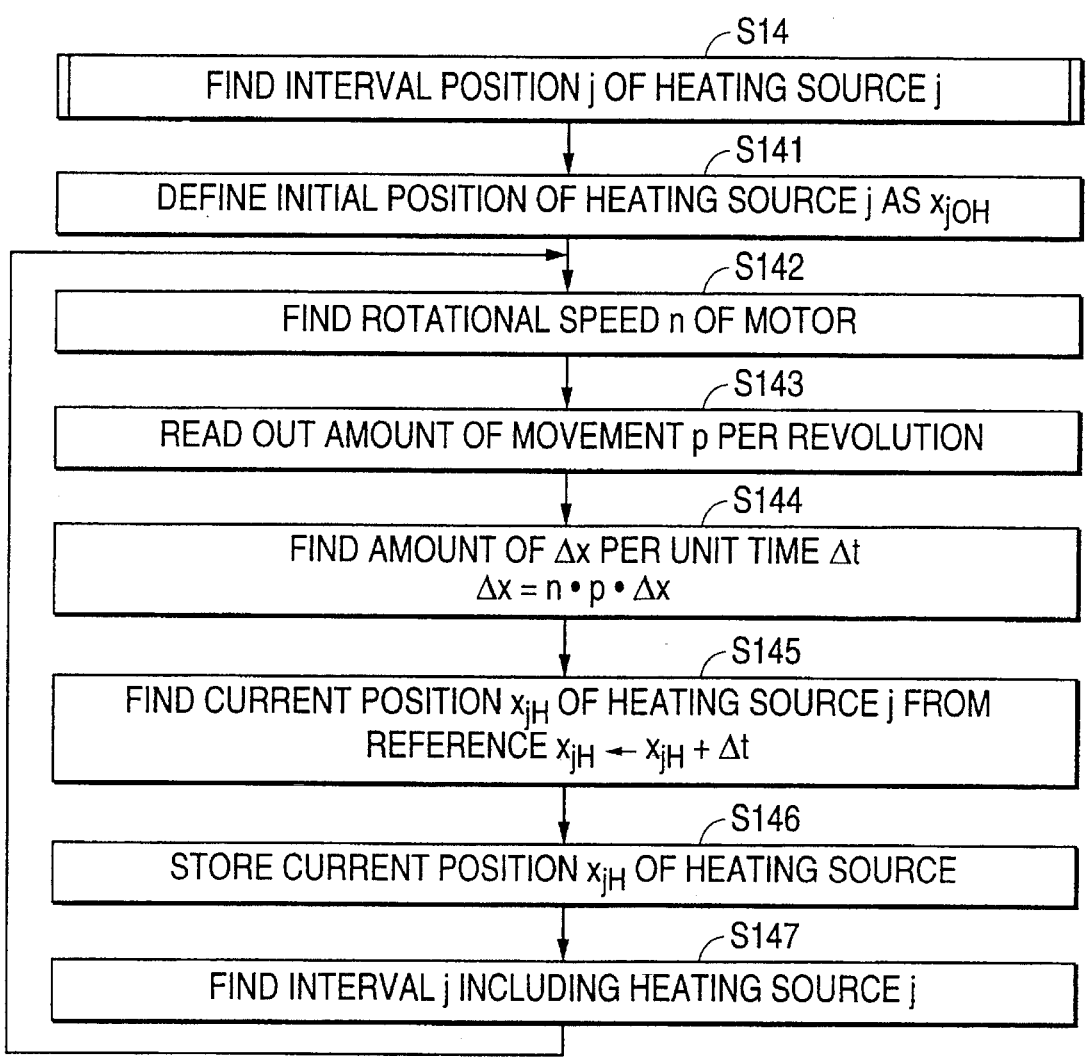
FIG. 5 is a flowchart to find an interval position of a heating source in the heat distribution model according to the present invention.
Figure 10:
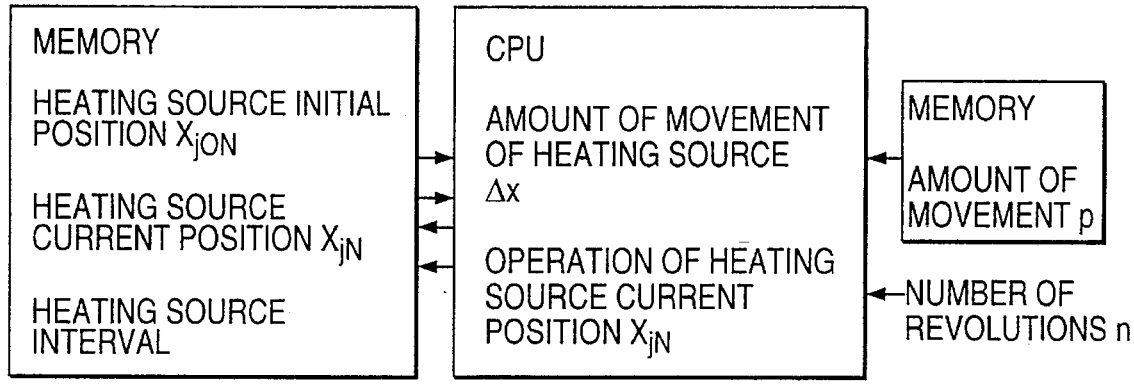
FIG. 10 is a block diagram to find an interval position in the heat distribution model of a heating source according to the present invention.

FIG. 5 is a flowchart to find an interval position i of the heating source j in the heat distribution model, and FIG. 10 is a block diagram for the estimation of interval position of the heating source. A description will now be given of the procedure to find the interval position j of the heating source j in the heat distribution model with reference to the block diagram of FIG. 10 and the flowchart of FIG. 5 by using reference numerals Step S141 to Step S147.

Step S141: It is initially assumed that the heating source j is positioned at an initial position $x_{jOH}$ in an initial state. The initial position is set to find a position of the heating source j during movement, and the initial position can be stored in the memory as shown in FIG. 15.

Step S142: The rotational speed n of the motor serving as the driving source is subsequently found. The number of revolutions n of the motor can be estimated depending upon, for example, a value inputted into the motor so that no detector is required to measure the number of revolutions n.

Step S143: In the driving system, an amount of movement p of the heating source j is previously set per revolution of the motor in a memory or the like, and the set value is read out. For example, when the driving system includes the ball screw, it is possible to use, as the amount of movement p, a pitch serving as an amount of movement of the ball screw in a direction of x-axis while the motor is once rotated. The amount of movement p is known and is previously stored in the memory so that the amount of movement p can be obtained by read-out in this process.

Step S144: An amount of movement $\Delta x$ per unit time $\Delta t$ is found. In case of the ball screw, the amount of movement $\Delta x$ can be found according to an expression: $\Delta x = n \cdot p \cdot \Delta t$. The operation can be carried out in a CPU.

Step S145: Next, a distance from the reference position to the current position of the heating source j is found, thereby finding a current position $x_{jH}$ of the heating source j. In first estimation after the elapse of the unit time from a movement starting time, it is possible to find the current position $x_{jH}$ of the heating source j by adding the amount of movement $\Delta x$ per unit time $\Delta t$ to the initial position $x_{jOH}$, that is, by the operation: $x_{jH} \leftarrow x_{jOH} + \Delta x$. In later estimations, the current position $x_{jH}$ can be found by adding the amount of movement $\Delta x$ per unit time $\Delta t$ to the preceding position $x_{jH}$ of the heating source j, that is, by the operation: $x_{jH} \leftarrow x_{jH} + \Delta x$.

Step S146: The current position $x_{jH}$ of the heating source j, found in Step S145, is stored in the current position $x_{jH}$ of the heating source j in the memory shown in FIG. 15. The storage of the current position $x_{jH}$ finally results in updated current position $X_{jH}$ in the memory.

Step S147: The current position $x_{jH}$ of the heating source j found in Step S146 is a position coordinate on the x-axis in FIG. 4(A). Then, the position coordinate is transformed into a position on an interval in the heat distribution model of the heating source j, thereby finding an interval j. The found interval j including the heating source j is stored in the memory shown in FIG. 15. At this time, a position of each interval i is displaced in response to thermal expansion in the driving system. Therefore, the current position x is found depending upon estimation of displacement in the interval as will be described infra, and the interval j is found according to coordinate corrected by reading out the current position x from the memory.

Subsequently, by repeating the process from Step S142 to Step S147, it is possible to read out a position of the heating source j during movement and find the interval j corresponding to the position.

Figure 6:
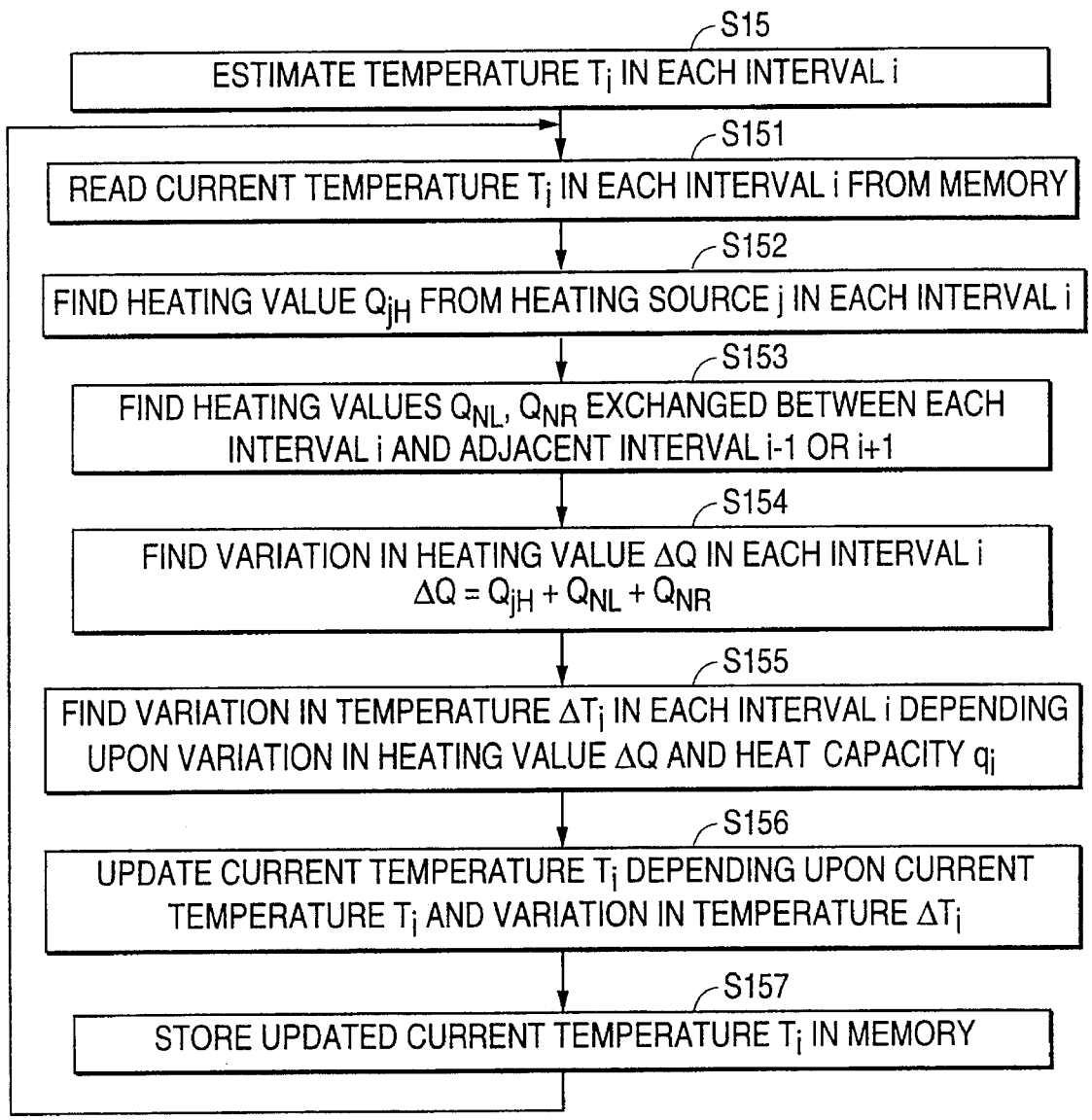
FIG. 6 is a flowchart to estimate a temperature $T_i$ in each interval i according to the present invention.

Step S15: After the position of the heating source j is estimated in the process from Step S141 to Step S147, the temperature Ti in each interval i is subsequently estimated in the heat distribution model as indicated in FIG. 6. In the estimation, a variation in heating value Q in each interval i is initially found to find a variation in temperature $\Delta T_i$ generated by the variation in heating value $\Delta Q$. Further, a current temperature $T_i$ is found by using the variation in temperature $\Delta T_i$.

Figure 3A:
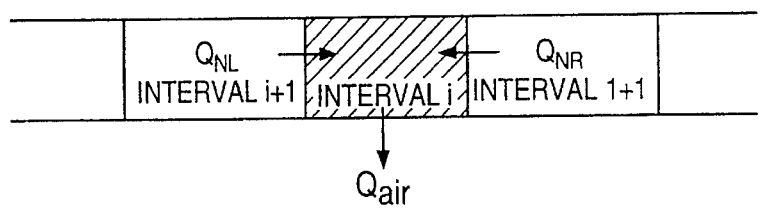
FIGS. 3A and 3B are typical diagrams showing movement of a heating value Q in each interval i according to the present invention.
Figure 3B:
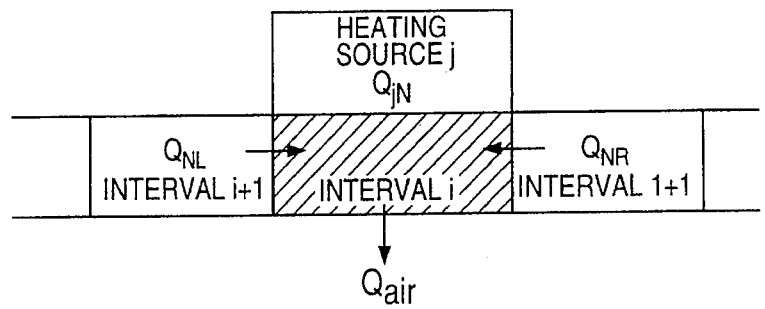

FIG. 3 is a typical diagram showing movement of the heating value Q in each interval i. FIG. 3(A) shows a state in which the heating source j is absent at a position of a focused interval i, and FIG. 3(B) shows a state in which the heating source j is present at the position of the focused interval i.

In FIG. 3(A), the interval i (a shaded portion in the drawing) is adjacently in contact with an interval (i−1) and an interval (i+1), and is in contact with outside air. In this case, a heating value $Q_i$ exchanged between the interval i and the adjacent intervals and the outside air can be represented by the following expression (1) as viewed from the interval i:

$$Q_i = Q_{NL} + Q_{NR} - Q_{air} \tag{1}$$

The heating value $Q_{NL}$ is a heating value exchanged between the interval i and the interval (i−1), and the heating value $Q_{NR}$ is a heating value exchanged between the interval i and the interval (i+1). Further, the heating value $Q_{air}$ is a heating value exchanged between the interval i and the outside air.

Here, the heating value $Q_{NL}$ can be found by a difference in temperature between the interval i and the interval (i−1), and can be represented by the expression (2)

$$Q_{NL} = Ki \cdot (T_{i-1} - T_i) \tag{2}$$

where Ki means a coefficient of heat transfer which is a characteristic value of material forming the driving system, and can be stored in the memory so as to be read out as required.

Further, the heating value $Q_{NR}$ can be found by a difference in temperature between the interval i and the interval (i+1) and can be represented by the expression (3)

$$Q_{NR}=K_r(T_{i+1}-T_i) \quad (3)$$

In addition, the heating value $Q_{air}$ can be found by a difference in temperature between the interval i and the outside air $T_{air}$ and can be represented by the expression (4):

$$Q_{air}=f(T_{air}-T_i) \quad (4)$$

where f is a function to show a state of heat dissipation to the outside air, and is previously found from an experiment or like as a function or a table to be stored in, for example, the memory.

Signs of the heating values $Q_{NL}$, $Q_{NR}$, and $Q_{air}$, represented by the above expressions (2), (3), and (4), show directions of movement of the heating value with respect to the interval i. That is, a positive sign indicates that the heating value is supplied to the interval i, and a negative sign indicates that the heating value is emitted from the interval i.

On the other hand, when the heating source j is present as shown in FIG. 3(B), in addition to the heating values $Q_{NL}$, $Q_{NR}$, and $Q_{air}$, a heating value $Q_{iH}$ is supplied from the heating source j. As viewed from the interval i, the exchanged heating value $Q_i$ can be represented by the following expression (5):

$$Q_i=Q_{iH}+Q_{NL}+Q_{NR}-Q_{air} \quad (5)$$

Therefore, the variation in heating value $\Delta Q$ can be represented by the above expressions (1) and (5).

It is possible to find the variation in temperature $\Delta T_i$ in the interval i by dividing the heating value $Q_i$ by the heat capacity qi in each interval i as follows:

$$\Delta T_i=Q_i/q_i \quad (6)$$

The heat capacity $q_i$ in each interval i is determined depending upon a coefficient of heat capacity of the material or a size thereof, and is previously stored in the memory. Further, the current temperature $T_i$ in the interval i can be found by adding the variation in temperature $\Delta T_i$ found by the expression (6) to the current temperature $T_i$ as follows:

$$T_i \leftarrow T_i + \Delta T_i = T_i + \{g \cdot Q_{iH} + k_i \cdot (T_{i-1} - T_i) + \quad (7)$$
$$k_i \cdot (T_{i+1} - T_i)f(T_{air} - T_i)\}/q_i = T_i +$$
$$\{g \cdot Q_{iH} + k_i \cdot (T_{i-1} + T_{i+1} - 2T_i)\}/q_i$$

where g is a function to return a value of one when the heating value $Q_{iH}$ is supplied from the heating source j in the interval, or return a value of zero when the heating value $Q_{iH}$ is not supplied, and g can be found by reading out an interval position of the heating source j stored in the memory shown in FIG. 15. For example, when an interval including the heating source j in the memory is identical with an interval i during the operation, the function $q_i$ returns a value of one. Otherwise, the function returns a value of zero. Further, in an interval 1 or an interval n at ends, $T_{i-1}$ and $T_{i+1}$ in the expression (7) are set to zero.

Figure 11:
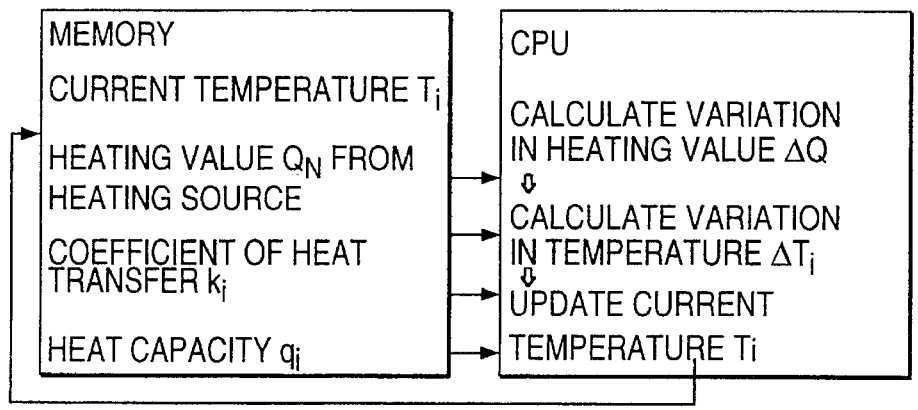
FIG. 11 is a block diagram to estimate a temperature Ti in each interval i according to the present invention.

FIG. 6 is a flowchart to estimate the temperature $T_i$ in each interval i. FIG. 11 is a block diagram for the estimation of temperature $T_i$ in internal i. A description will now be given of the procedure to estimate the temperature $T_i$ in each interval i with reference to the block diagram of FIG. 11 and the flowchart of FIG. 6 by using reference numerals from Step S151 to Step S157.

Step S151: The current temperature $T_i$ in each interval i is initially read out from the memory into a work area such as CPU.

Step S152: Subsequently, the heating value $Q_{jH}$ from the heating source j in each interval i is found. Since the heating value $Q_{jH}$ has been estimated in Step S13, the value stored in the memory may be read out. Further, the position of the heating source j in the interval has been estimated in Step S14 so that the value stored in the memory may be read out.

Step S153: Heat exchange of the heating value Qi is performed between the intervals i and the adjacent intervals (i-1) and (i+1), and the outside air. The heating value $Q_i$ is found by the heating values $Q_{NL}$, $Q_{NR}$, and $Q_{air}$ represented by the expressions (2), (3), and (4) and the relational expression (1) of the expressions. The heating values $Q_{NL}$, $Q_{NR}$, and $Q_{air}$ are calculated by reading out, from the memory, the current temperature T, the coefficient of heat transfer k, and the function f to show a state of heat dissipation to the outside air.

Step S154: The variation in heating value $\Delta Q$ in each interval i is subsequently found. It is possible to find the variation $\Delta Q$ by substituting the heating values $Q_{NL}$, $Q_{NR}$, $Q_{air}$, and $Q_{iH}$ estimated in Steps S152 and S153 in the expression (5).

Step S155: The variation in temperature $\Delta T_i$ each interval i is found by the variation in heating value $\Delta Q$ and the heat capacity $q_i$. The variation in temperature $\Delta T_i$ can be found by dividing the heating value $Q_i$ by the heat capacity $q_i$ of each interval i according to the expression (6) as described above. In this operation, the heat capacity qi of each interval i stored in the memory may be read out.

Step S156: Depending upon the current temperature $T_i$ and the variation in temperature $\Delta T_i$, the current temperature $T_i$ is updated by using the expression (7). In this operation, the current temperature $T_i$ is updated by reading out the current temperature $T_i$ and the position of the heating source j in the interval which are stored in the memory. In this case, the function g returns a value of one when the read-out interval including the heating source j is identical with the interval during update, or returns a value of zero when the read-out interval is not identical with the interval during update.

Step S157: The current temperature $T_i$ updated in Step S156 is stored in the memory so as to modify the preceding data about the current temperature $T_i$. The processing can establish a state in which the updated current temperature $T_i$ and an initial temperature $T_0$ are continuously stored in the memory. In an interval which is not directly in contact with the heating source j, if the initial temperature is equal to the outside air temperature, the initial temperature is held until a variation in temperature is caused after heat is sequentially moved from the heating source j through other intervals. That is, the current temperature $T_i$ is not superficially updated.

Step S16: The amount of displacement $\Delta x_i$ in each interval i is estimated by using a temperature distribution in the heat distribution model estimated in the above process of Step S15.

For the estimation of the amount of displacement $\Delta x_i$, a variation in temperature is found depending upon the current temperature $T_i$ and the initial temperature $T_0$ in each interval i, and thermal expansion caused by the variation in temperature is found according to the operation using the length $L_i$ and the coefficient of linear expansion $Q_i$ in each interval i.

Figure 4B:
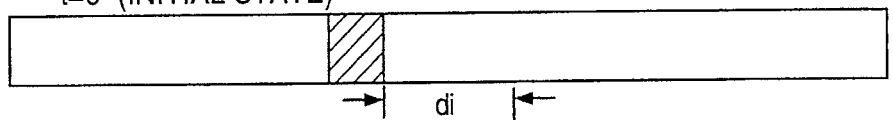
Figure 4C:

FIG. 4(B) shows an initial state, that is, a shaded position of the interval i when t=0, and FIG. 4(C) shows another shaded position of the interval i when $t=t_m$. In FIG. 4(C) the variation in displacement $\Delta x_i$ is generated for each interval i. The variation in displacement $\Delta x_i$ in each interval i can be represented by the expression (8):

$$\Delta x_i = L_i \cdot \{1 = \alpha_i \cdot (T_i - T_0)\} \qquad (8)$$

Figure 7:
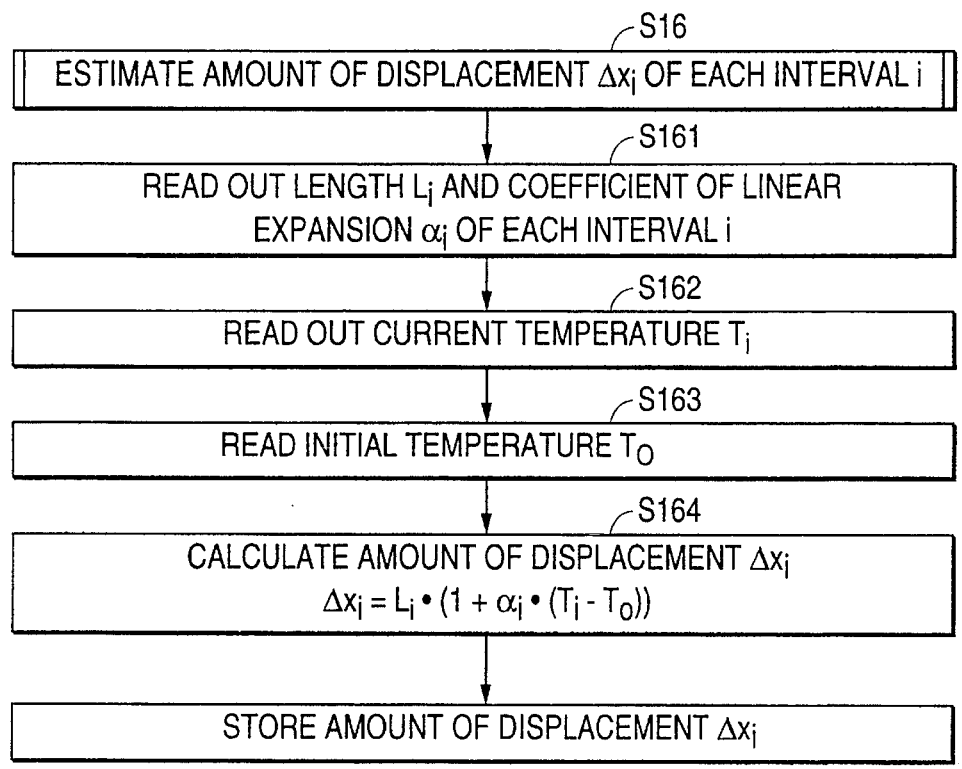
FIG. 7 is a flowchart to estimate an amount of displacement $\Delta x_i$ in each interval i according to the present invention.
Figure 12:
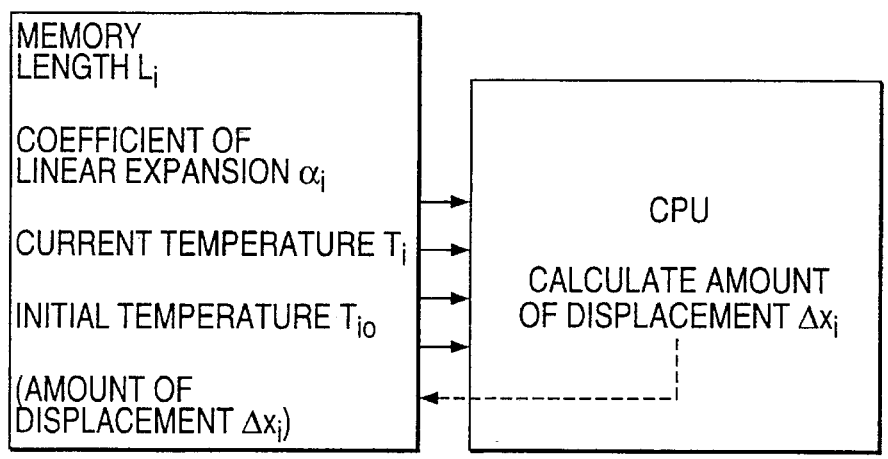
FIG. 12 is a block diagram to estimate an amount of displacement $\Delta x_i$ in each interval i according to the present invention.

FIG. 7 is a flowchart to estimate the amount of displacement $\Delta x_i$ in each interval i. FIG. 12 is a block diagram for the estimation of amount of displacement $\Delta X_i$ of interval i. A description will now be given of the estimation of the variation in displacement $\Delta x_i$ in each interval i with reference to the block diagram of FIG. 12 and the flowchart of FIG. 7 by using reference numerals Step S161 to Step S165.

Step S161: The length $L_i$ and the coefficient of linear expansion $\alpha_i$ in each interval i are initially read out from the memory into a processing area such as CPU.

Step S162 : The current temperature Ti updated to be stored in the memory in Step S15 is subsequently read out into the processing area of the CPU.

Step S163: Further, the initial temperature $T_0$ stored in the memory is read out into the processing area of the CPU.

With the above process, values required for the operation of the amount of displacement $\Delta x_i$ in each interval i in the expression (8) are read out into the processing area, including the length $L_i$ of each interval i, the coefficient of linear expansion $\alpha_i$, the current temperature Ti, and the initial temperature $T_{i0}$.

Steps S164 and S165: The amount of displacement $\Delta x_i$ is found according to the operation of the expression (8), and a value thereof is stored in the memory. The amount of displacement $\Delta x_i$ is updated for each operation.

Step S17: Subsequently, the amount of displacement $\Delta x_i$ estimated in the above process of Step S16 is used to find a position $x_i$ of each interval i from the reference position. The reference position is a fixed point whose coordinate position is not varied even in case of generation of thermal displacement. The position $x_i$ of each interval i can be defined as a distance from the fixed point.

The position $x_i$ of interval i is found by the length of each interval $x_i$ and accumulation of the amount of displacement $\Delta x_i$ found in Step S16, and can be represented by the following expression (9) :

$$x_i = \Delta x_i + \sum_{i=1}^{i-1} x_i \qquad (9)$$

Figure 8:
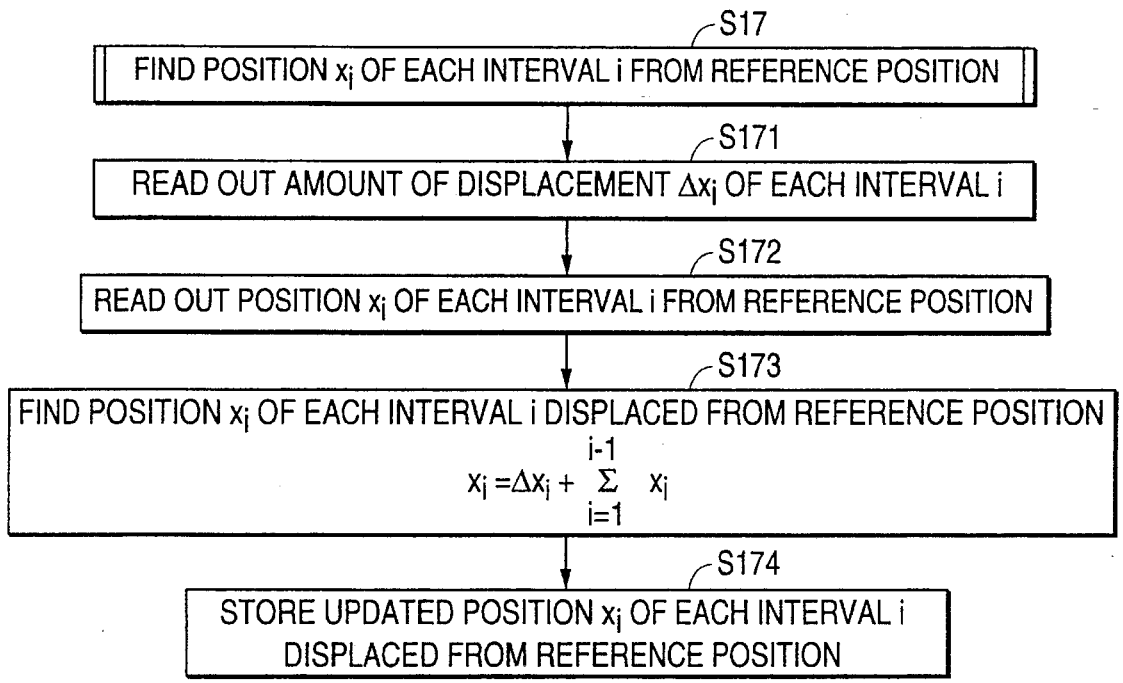
FIG. 8 is a flowchart to find a position $x_i$ of each interval i from a reference position according to the present invention.
Figure 13:
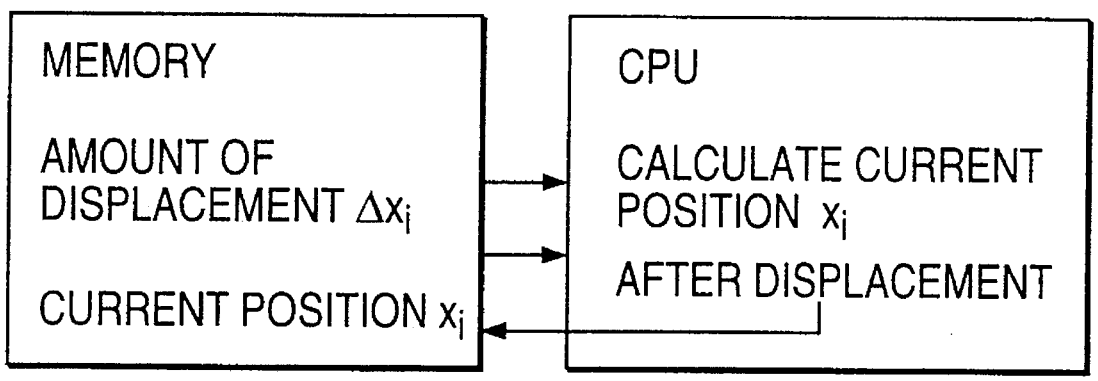
FIG. 13 is a block diagram to estimate a position $x_i$ of each interval i from a reference position according to the present invention.

FIG. 8 is a flowchart to find the position $x_i$ of each interval i from the reference position. FIG. 13 is a block diagram to find the position $x_i$ of interval i form reference position. A description will now be given of the procedure to find the position $x_i$ of each interval i from the reference position with reference to the block diagram of FIG. 13 and the flowchart of FIG. 8 by using reference numerals Step S171 to Step S174.

Steps S171 and S172: The amount of displacement $\Delta x_i$ in each interval i and the position $x_i$ of each interval i from the reference position are read out from the memory into the processing area of the CPU. It is thereby possible to provide values required for the operation of the expression (9).

Step S173: The operation of the expression (9) is performed by using the values of $\Delta x_i$ and xi read out in the above process to find the position $x_i$ of each interval i from the reference position after thermal displacement. The operation is a cumulative operation so that the position $x_i$ can be obtained sequentially from the interval closer to the reference position.

Step S174: The position $x_i$ of each interval i from the reference position found in the above process is stored in the memory in order to modify data of the position.

Step S18: The position $x_i$ found in the above process of Step S17 is used to find the amount of displacement error di of each interval i. In FIGS. 4(B) and (4C), the amount of displacement error di is a difference between one x-coordinate point of the interval i from the reference position in the initial state and the other x-coordinate point of the interval i from a current reference position. The amount of displacement error $d_i$ is a cumulative value of the amounts of displacement $\Delta x_i$ of intervals, which are positioned in a distance from the reference position to the interval i. Therefore, the amount of displacement error di of each interval i is the displacement from the initial position, which can be obtained by subtracting the initial position $x_{i0}$ from the position $x_i$ from the reference position. The operation can be represented by the following expression (10):

$$d_i = x_i - x_{i0} \qquad (10)$$

Figure 9:
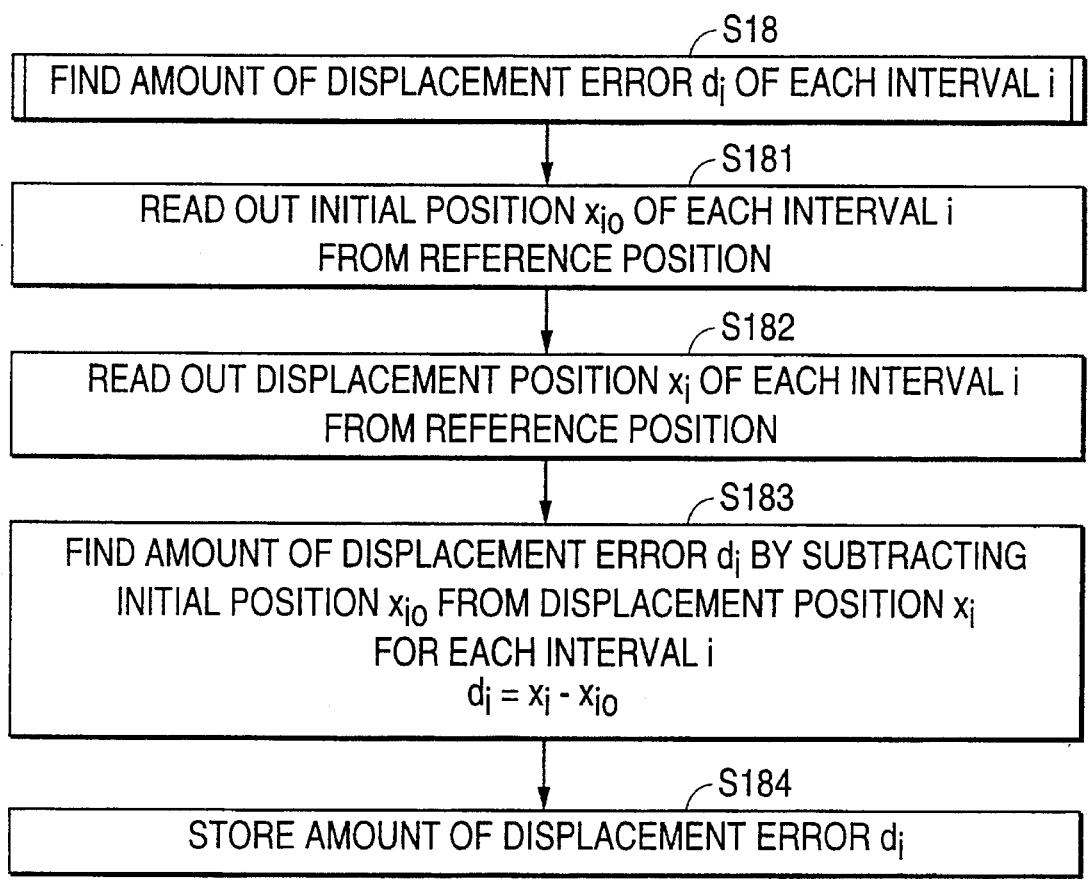
FIG. 9 is a flowchart to find an amount of displacement error $d_i$ in each interval i according to the present invention.
Figure 14:
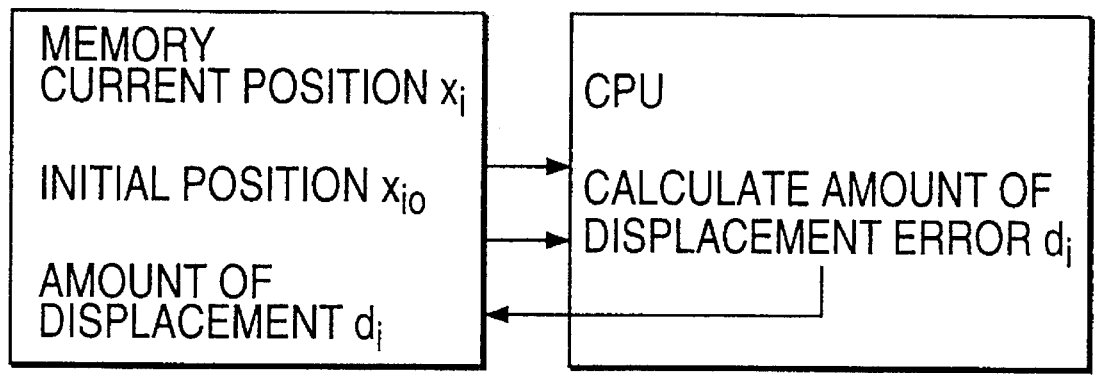
FIG. 14 is a flowchart to find an amount of displacement error di in each interval i according to the present invention.

FIG. 9 is a flowchart to find the amount of displacement error $d_i$ in each interval i. FIG. 14 is a block diagram to find the amount of displacement error $d_i$ of interval i. A description will now be given of the procedure to find the amount of displacement error $d_i$ of each interval i with reference to the block diagram of FIG. 14 and the flowchart of FIG. 9 by using reference numerals Step S181 to Step S184.

Steps S181 and S182: Initially, the initial position $x_{i0}$ of each interval i from the reference position and the current position $x_i$ of each interval i from the reference position are read out from the memory into the processing area of the CPU. It is thereby possible to provide values required for the operation of the expression (10).

Step S183: The operation of the expression (10) is subsequently performed by using the values of the initial position $x_{i0}$ and the current position $x_i$ which are read out in the above process to find the amount of displacement error $d_i$ of each interval i.

Step S184: The amount of displacement error di of each interval i found in the above process is stored in the memory so as to modify data of the amount of displacement error.

Thus, it is possible in the process to find the thermal displacement error $d_i$ of each interval i from the reference position, caused by the thermal displacement.

Step S19: A position of the target model can be corrected by correcting the thermal displacement error $d_i$ found in the above process from Step S1 to Step S184. For example, in a numerical control unit, it is possible to correct the thermal displacement error $d_i$ as position error according to a well-known method.

In a method of correcting the thermal displacement error in the driving system of the machine tool according to the present invention, a special detector is not required for correction. That is, it is possible to use, as data required for the correction, data which can be known without the detector in a typical driving system.

As one aspect of a driving system according to the present invention, the present invention may be applied to a driving mechanism for moving in a linear fashion, a driving mechanism for rotating, or a combined mechanism thereof. Further, as one aspect of the operation used for the correction of the present invention, the operation can be performed by using an operation expression or a corresponding data table. There is an effect in that the values can be calculated by using only one expression when the operation expression is employed. Alternatively, there is another effect in that a speed of the calculation for the values is improved when the data table is used.

As set forth above, according to the present invention, it is possible to provide a method of correcting the thermal displacement error in the driving system of the machine tool without a detector.

What is claimed is:

1. A method of correcting thermal displacement error in a driving system of a machine tool, comprising the steps of:

forming a heat distribution model including said driving system;

estimating a heating value supplied to the heat distribution model depending upon an amount of drive in said driving system;

estimating a temperature distribution state in the distribution model by finding a time variation of heating value in the heat distribution model receiving supply of the estimated heating value;

finding an amount of thermal displacement in the driving system depending upon said temperature distribution state; and finding a correction value for thermal displacement correction depending upon the amount of thermal displacement.

2. A thermal displacement correcting method of a machine tool according to claim 1, wherein said heat distribution model includes a plurality of elements which are divided into a finite number of intervals.

3. A thermal displacement correcting method of a machine tool according to claim 1, wherein a supply source of said heating value is a driving source in the driving system, and an amount of drive in said driving system is a driving speed and driving torque of the driving source.

4. A thermal displacement correcting method of a machine tool according to claim 1, wherein a supply source of said heating value is a driving mechanism portion in a system of amount of drive, and an amount of drive in said driving mechanism portion is a driving speed of the driving source.

5. A thermal displacement correcting method of a machine tool according to claim 1, wherein the time variation of said heating value is found depending upon heating value exchange between adjacent areas.

* * * * *